D. M. HUNT.
TRANSMISSION GEARING FOR AUTOMOBILES.
APPLICATION FILED AUG. 5, 1913.

1,091,342.

Patented Mar. 24, 1914.

2 SHEETS—SHEET 1.

Witnesses
Geo. E. Frech.
Geo. Ackman

Inventor
Don M. Hunt.

By Victor J. Evans
Attorney

D. M. HUNT.
TRANSMISSION GEARING FOR AUTOMOBILES.
APPLICATION FILED AUG. 5, 1913.
1,091,342.
Patented Mar. 24, 1914.
2 SHEETS—SHEET 2.
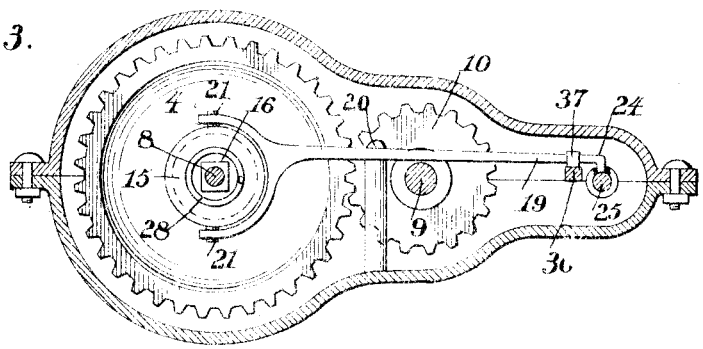
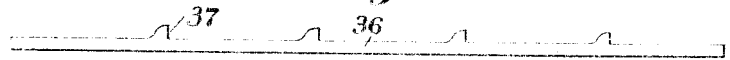
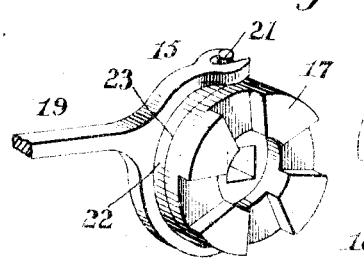
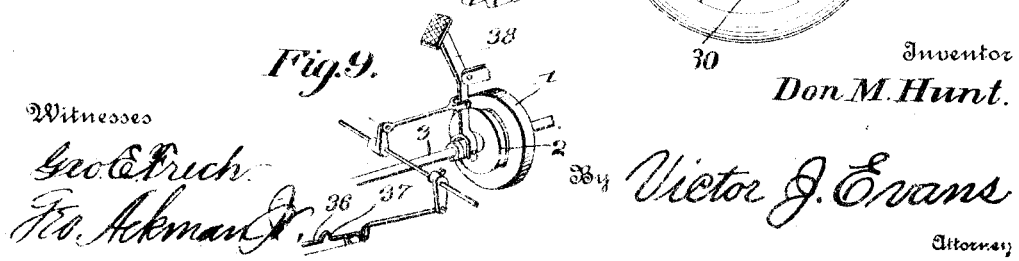
Inventor
Don M. Hunt.
Witnesses
Geo. E. Frich
Fro. Ackman
By Victor J. Evans
Attorney

UNITED STATES PATENT OFFICE.

DON M. HUNT, OF OREGON, MISSOURI.

TRANSMISSION-GEARING FOR AUTOMOBILES.

1,091,342.

Specification of Letters Patent.

Patented Mar. 24, 1914.

Application filed August 5, 1913. Serial No. 783,148.

*To all whom it may concern:*

Be it known that I, DON M. HUNT, a citizen of the United States, residing at Oregon, in the county of Holt and State of Missouri, have invented new and useful Improvements in Transmission-Gearing for Automobiles, of which the following is a specification.

This invention relates to transmission gearing for automobiles, the object of the invention being to provide a simple, practical and reliable changeable speed transmission gearing for automobiles and other motor propelled vehicles, whereby the usual gear shift lever is dispensed with and the shifting from one speed to another or reverse is accomplished and controlled by a manually operated thumb lever on the steering control of the machine, the gear shifting mechanism being operated in connection with the clutch shifting mechanism.

With the above and other objects in view, the invention consists in the construction, combination and arrangement of parts, as will hereinafter be more fully described, illustrated and claimed.

Figure 1:
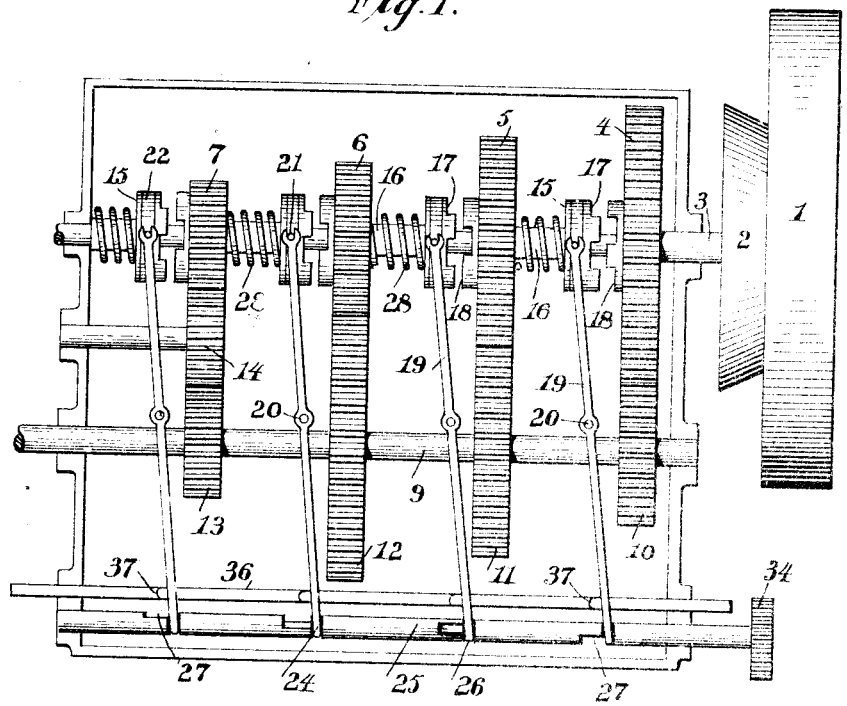
Figure 2:
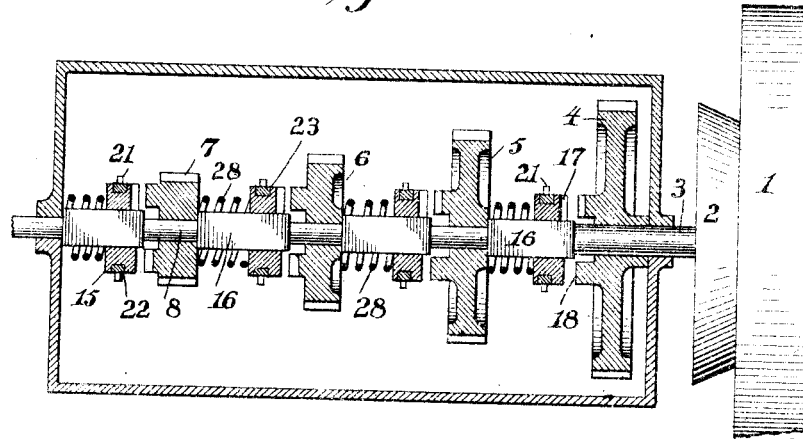

In the accompanying drawings: Figure 1 is a plan view of the transmission mechanism of this invention showing the same in neutral position. Fig. 2 is a vertical section on the line 2—2 of Fig. 1. Fig. 3 is a detail vertical section illustrating the connection between the thumb lever and the selecting shaft. Fig. 4 is a detail view of the main transmission shaft. Fig. 5 is a similar view of the selecting shaft. Fig. 6 is a detail view of the clutch rod. Fig. 7 is a plan view of the controlling hand wheel showing the thumb lever and rack. Fig. 8 is a detail view of one of the locking collars, showing the coöperating locking faces and the adjacent portion of one of the trip levers. Fig. 9 is a detail perspective view on a reduced scale showing the means whereby the clutch operating rod is actuated by the clutch lever.

Referring to the drawings 1 designates the fly-wheel of an ordinary internal combustion motor such as is now commonly used in automobiles, motor trucks and similar vehicles, 2 the usual cone clutch which coöperates with an internal cone face within the fly-wheel 1 or carried thereby, and 3 the main or transmission shaft which is directly driven by the clutch 2, the clutch in turn being driven by the fly-wheel 1 which is fast on the shaft of the engine. All of the parts thus far referred to are of the usual construction and arrangement.

In carrying out the present invention, driving gear wheels 4, 5, 6 and 7 are mounted loosely on the shaft 3, said shaft being provided with the smooth cylindrical portions 8 to receive said wheels and permit the shaft to turn without imparting a corresponding movement to said wheels.

Extending parallel to the transmission shaft 3 is a jack shaft 9 having fast thereon driven gear wheels 10, 11, 12 and 13, the wheels 10, 11 and 12 being in constant mesh with the wheels 4, 5 and 6 while the wheel 13 is in constant mesh with an intermediate or reversing gear wheel 14 which is also constantly in mesh with the wheel 7 on the shaft 3.

In connection with the wheels 4, 5, 6 and 7, I employ locking collars 15 which are mounted on squared portions 16 of the shaft 3 so that said collars rotate with the shaft. At one side each collar 15 is provided with a locking face 17 movable toward and away from a corresponding locking face 18 on the adjacent face of the respective gear wheel 4, 5, 6 or 7 as the case may be, the collar 15 being shiftable toward and away from the locking face 18 by sliding longitudinally of the shaft 3 on the squared portion 16 of said shaft.

In order to shift the collars 15 lengthwise of the shaft 3, I use in connection with each collar a trip lever 19 which is fulcrumed intermediate its ends at 20, one end of said lever being forked and notched at the extremities of the fork to engage oppositely projecting pintles 21 on a band or ring 22 which surrounds the collar 15 and lies in a groove 23 therein. The opposite end of each lever 19 is extended as shown at 24 and is received in a groove in a selecting shaft 25 extending in parallel relation to the shafts 3 and 9 above described and as shown in Fig. 1. Each of the grooves in the selecting shaft 25 comprises a circumferential portion 26 and an offset portion 27 extending longitudinally of the shaft 25 so that when the shaft is set in a certain position, the end of one of the levers 19 will be allowed to enter the longitudinal portion 27 of the groove referred to. In order to insure this operation, a thrust spring 28 is located behind each of the locking collars 15, said spring being of the coiled expansion type and serving to urge the collar toward its respective driven gear wheel so as to cause the faces 17 and 18 to interlock. In this way the selected driving gear wheel is made fast to the transmission shaft 3 so as to impart a corresponding movement to the driven wheel mating therewith and thereby rotating the jack shaft 9 at a speed in accordance with the relative sizes of the intermeshing gear wheels. The jack shaft 9 is connected to the driving axle and wheels of the machine (not shown) so as to impart motion thereto, this being well understood by those familiar with the art to which this invention appertains.

All of the shafts 3, 9 and 25 above referred to are journaled in a common transmission gearing case 29 as well as all of the driving, driven and reversing gear wheels above referred to.

By reference to Fig. 5 it will be seen that the longitudinal portions 27 of the grooves in the selecting shaft 25 are arranged out of line with each other or in staggered relation while all of the lever ends working in said grooves are arranged in a common plane. It is therefore possible for only one of the levers at a time to move into one of the longitudinal portions 27 referred to and when this occurs, the thrust spring 28 presses the respective collar 15 into engagement with the appropriate gear wheel thereby locking said gear wheel to the transmission shaft. Under this adjustment, all of the remaining levers 19 are held in a position illustrated in Fig. 1 by reason of the engagement of the outer ends thereof with the transverse portions 26 of the grooves in the selecting shaft.

30 designates a thumb lever or similar manually controlled lever shown as arranged upon the hand control wheel 31 by means of which the machine is steered, said lever 30 being fast on the upper end of a gear shifting shaft 32 which may extend downwardly through the steering column where it is connected by gear wheels one of which is shown at 34 to the selecting shaft 25. This enables the shaft 25 to be turned by simply moving the lever 30 on the hand wheel, 35 designating a segmental rack provided with notches or teeth to hold the lever 30 at any desired point of adjustment. The rack 35 is also shown as provided with the characters N, 1, 2, 3 and R to designate respectively neutral, first, second and third speed and reverse, the said characters and the position of the lever 30 corresponding with the adjustment of the selecting shaft 25 to effect the release of the respective trip levers 19.

36 designates a clutch operating rod which is slidable longitudinally through bearings in the transmission case, said rod being provided with shoulders or projections 37 which strike against the levers 19 and simultaneously throw all of the levers to the position illustrated in Fig. 1 to unlock all of the wheels 4, 5, 6 and 7 from the shaft 3. The rod 36 is connected with the usual clutch lever conventional indicated at 38 so that when the clutch is thrown out, the rod 36 is operated to unlock all of the driven gear wheels on the shaft 3.

After the clutch has been thrown out by operating the usual clutch lever and while the clutch remains out, the lever 30 is operated to select a gear which brings one of the longitudinal portions 27 of the groove in the selecting shaft into line with the proper trip lever 19. Then when the clutch is let in, the particular lever is released and allowed to move along the portion 27 of the groove which permits the thrust spring 28 to shift the locking collar 15 and lock the proper driving gear to the shaft 3, all of the other driving gears being left loose on the shaft 3 so that they are not affected by the rotation thereof.

The gear shifting mechanism above described is operable by the driver without requiring him to shift his position thus doing away with the arduous process of reaching forward to grasp and manipulate the ordinary gear shift lever now in common use every time the machine is started and stopped and every time a shift is made from one gear to another.

What I claim is:

1. In changeable speed transmission gearing, the combination of a transmission shaft, an engine shaft, a clutch for connecting and disconnecting said shafts, a jack shaft parallel to the transmission shaft, driven gear wheels of different sizes fast on said jack shaft, mating driving gear wheels loose on the transmission shaft, a locking collar for each driving gear wheel rotating with and slidable longitudinally of the transmission shaft, means for moving said locking collars into engagement with their respective gear wheels, a series of collar shifting levers, one for each collar, a clutch operating member embodying means operating to move all of said levers to unlock the driving gear wheels, and a manually controlled selecting device operating to release one of said levers when the clutch is let in.

2. In changeable speed transmission gearing, the combination of a transmission shaft, an engine shaft, a clutch for connecting and disconnecting said shafts, a jack shaft parallel to the transmission shaft, driven gear wheels of different sizes fast on said jack shaft, mating driving gear wheels loose on the transmission shaft, a locking collar for each driving gear wheel rotating with and slidable longitudinally of the transmission shaft, a thrust spring behind each collar, a series of collar shifting levers, one for each collar, a clutch operating member embodying means operating to move all of said levers to unlock the driving gear wheels, and a manually controlled selecting device operating to release one of said levers when the clutch is let in.

3. In changeable speed transmission gearing, the combination of a transmission shaft, an engine shaft, a clutch for connecting and disconnecting said shafts, a jack shaft parallel to the transmission shaft, driven gear wheels of different sizes fast on said jack shaft, mating driving gear wheels loose on the transmission shaft, a locking collar for each driving gear wheel rotating with and slidable longitudinally of the transmission shaft, means for moving said locking collars into engagement with their respective gear wheels, a series of collar shifting levers, one for each collar, a clutch operating member embodying means operating to move all of said levers to unlock the driving gear wheels, and a manually controlled selecting device operating to release one of said levers when the clutch is let in, said selecting device consisting of a shaft having grooves in which said levers rest, each groove consisting of a portion extending circumferentially of its shaft and another portion extending longitudinally of the shaft.

4. In changeable speed transmission gearing, the combination of a transmission shaft, an engine shaft, a clutch for connecting and disconnecting said shafts, a jack shaft parallel to the transmission shaft, driven gear wheels of different sizes fast on said jack shaft, mating driving gear wheels loose on the transmission shaft, a locking collar for each driving gear wheel rotating with and slidable longitudinally of the transmission shaft, means for moving said locking collars into engagement with their respective gear wheels, a series of collar shifting levers, one for each collar, a clutch operating member embodying means operating to move all of said levers to unlock the driving gear wheels, a manually controlled selecting device operating to release one of said levers when the clutch is let in, said selecting device consisting of a shaft having grooves in which said levers rest, each groove consisting of a portion extending circumferentially of its shaft and another portion extending longitudinally of the shaft, and a thumb lever on the steering control for operating said selecting shaft.

In testimony whereof I affix my signature in presence of two witnesses.

DON M. HUNT.

Witnesses:
C. J. HUNT,
W. P. SCHULTE.